W. B. CLARK.
TRUCK ATTACHMENT.
APPLICATION FILED OCT. 30, 1911.
1,059,595.
Patented Apr. 22, 1913.
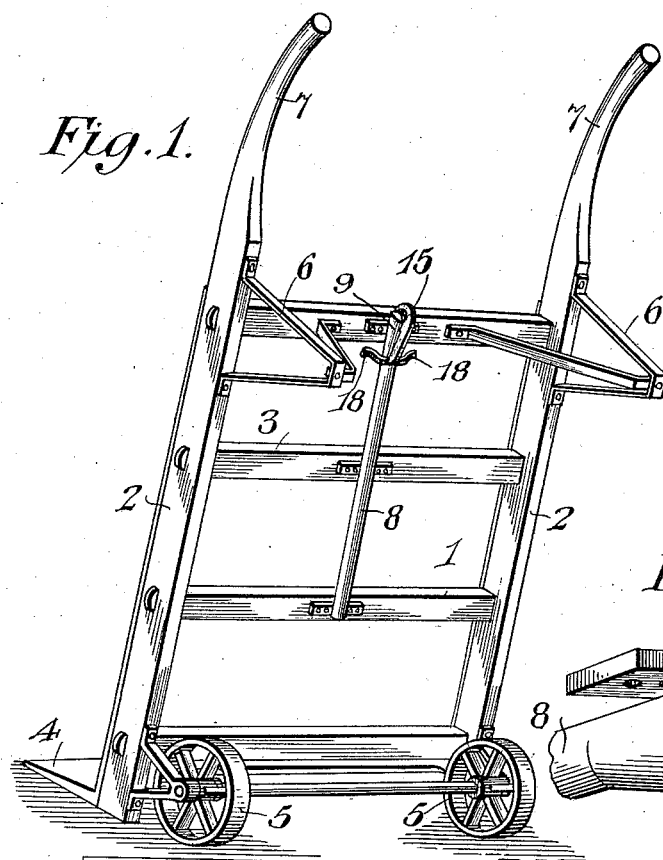
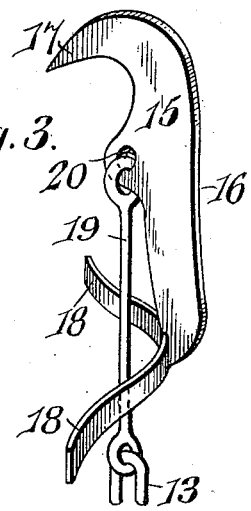
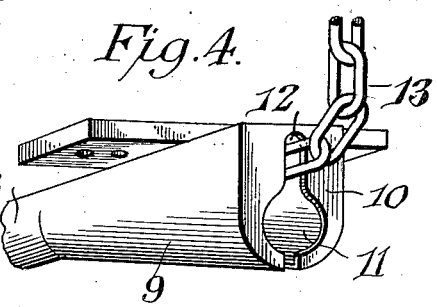
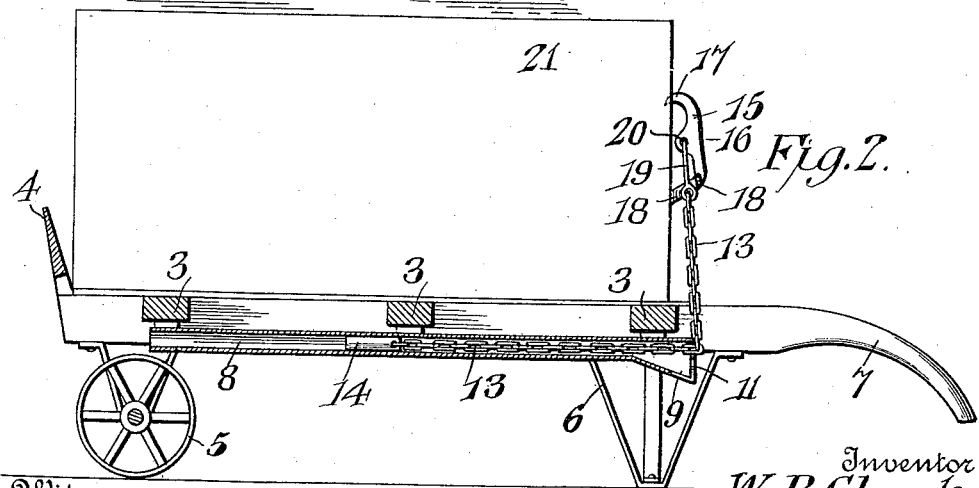
Witnesses
Jas. K. McCathran
Inventor
W. B. Clark,
By E. G. Siggers
Attorney

UNITED STATES PATENT OFFICE.

WILLIAM BRUCE CLARK, OF ST. JOSEPH, MISSOURI.

TRUCK ATTACHMENT.

1,059,595. Specification of Letters Patent. Patented Apr. 22, 1913.

Application filed October 30, 1911. Serial No. 657,449.

*To all whom it may concern:*

Be it known that I, WILLIAM BRUCE CLARK, a citizen of the United States, residing at St. Joseph, in the county of Buchanan and State of Missouri, have invented a new and useful Truck Attachment, of which the following is a specification.

This invention relates to attachments for trucks, and especially to the form of attachment calculated to facilitate the loading and unloading and transportation of freight upon a truck by one man, where otherwise a helper would be required.

In the handling of large boxes and the like, the truck lip is ordinarily inserted beneath one edge of the box, which is then by hand tilted over onto the truck body, and if the box be a large one, it is necessary for a helper to hold it in place on the truck to prevent it toppling back again during transportation.

By my invention the box is grasped by a grab forming part of the attachment secured to the truck and securely held during loading, transportation and unloading much better than could be done by a helper, or by any of the truck attachments heretofore introduced and over which this is an improvement.

An advantageous feature of my invention is its capacity of gripping the box at any point upon its end or side as distinguished from grippers, which must be applied around the corner or other projection to insure a hold, and it further presents an improved and efficient automatic lock for the chain, or other flexible connection between the gripping device and the truck body.

Having these objects in view, the invention resides in the improved construction and arrangement of parts pointed out in the appended claims, and hereafter described in detail in connection with the accompanying drawing, wherein is illustrated a preferred embodiment of the invention, and in which:

Figure 1 is a perspective view of a truck with the attachment in place but not in use. Fig. 2 is a vertical longitudinal section through the truck with the box thereon and the attachment in use. Fig. 3 is a detail of the grab or grip attachment. Fig. 4 is a fragmentary detail, showing the automatic lock.

Referring to the drawing, the numeral 1 indicates a hand truck of the usual kind and comprising the side rails 2, cross bars 3, lip 4, wheels 5, legs 6 and handles 7. Beneath the body of the truck and secured to the cross bars midway between the side rails is a tubular case 8, shown as extending longitudinally of the truck across three of the cross bars with its rear end terminating at the rear of the truck body. This case 8 may be open at the forward end, and is preferably flared downwardly at the rear end as at 9. The enlarged rear end of the case is fitted with a closure 10, which has in its lower portion a substantially circular opening 11 and extending upwardly therefrom a slot 12. This opening 11 is of sufficient size to permit the free passage back and forth of a chain 13, while the slot 12 is sufficiently wide to receive one of the chain links edgewise, but too narrow to receive the link crosswise.

Within the case the chain 13 is stored and has attached to its forward end a weight 14, or other means for retracting the chain in the case when not in use. Attached to the rear end of the chain, which projects through the opening 11, is a suitable gripping device, such as the grab 15, which preferably consists of the body portion 16, having at its forward end a claw 17 and at its rear end legs 18, while a link 19 attached to the lower portion of the body at 20 serves as a connection between the grab and the chain 13.

The manner of use is as follows: The lip of the truck in the position shown in Fig. 1 is slipped beneath the box 21, or other article and the gripping device is pulled out of the case through the opening 11, the grab 15 is placed upon the box, and the tension exerted upon the chain in tilting the truck back to transporting position causes one of the links of the chain to be drawn into the slot 12, preventing its further withdrawal from the case, the tension at the same time forcing the claw 17 into the box, this relation being maintained during transportation by the weight of the box itself and its tendency to tilt forward. This characteristic of the gripping device by which it secures a firm hold upon a flat surface is due to the peculiar form of construction, the rear end of the grab being supported in such manner that the strain is applied to the body portion along a line between such point of support and the point of engagement of the claw 17 with the box surface, whereby the greater the strain the deeper the claw 17 will be forced into the box.

Where it can be advantageously done, the gripping device can be applied in the usual manner by engaging the claw 17 over the corner of the box, but its capability of attachment to a plain surface greatly increases its range of usefulness extending its application to boxes or other articles of a size too great to permit of use in that manner. It is also possible in handling articles of peculiar shape to pass the chain around the underside of the handle to engage the article upon the side instead of the end or top.

The automatic locking arrangement is of especial advantage in this connection, as the chain can be retracted from the case, and the grab attached to the box by the use of one hand only, the chain automatically locking itself as it is lifted into the slot in the act of applying the grab.

When the box is unloaded, the truck being again brought into the position shown in Fig. 1, the releasing of the gripping device 15 permits the weight 14 to retract the chain into the case out of the way when not in use and in position to be availed of instantly when needed.

Having thus fully described my invention, what I claim as new and desire to secure by Letters Patent, is:—

1. An attachment for trucks and the like, comprising a chain, a gripping device carried by one end of the chain, a case carried by the truck, and a closure for the case having an opening therethrough communicating with the interior of the case and of a size sufficiently large to permit the chain to pass freely therethrough, said opening having a slot extending therefrom toward the load carrying surface of the truck and of a width to receive a link of the chain edgewise, but not crosswise, said chain being provided with means within the case tending to move the chain into the case.

2. An attachment for trucks and the like comprising a case mounted on the truck and having a laterally expanded portion toward the handle end of the truck, a chain provided with means tending to normally draw it into the case, a gripping device carried by the end of the chain exterior to the case, and a cover member carried by the laterally expanded end of the case with an opening communicating with said laterally expanded end of the case, and of a size sufficiently large to permit the chain to pass freely therethrough, said opening having a slot extension directed toward the load carrying surface of the truck and of a width to receive a link of the chain edgewise but not crosswise.

3. An attachment for trucks and the like comprising a case mounted on the truck, a closure at one end of the case having an opening with a slot extending laterally therefrom, a chain stored within the case with one end projecting through the opening at the rear end, and a gripping device attached to the projecting end of the chain and adapted to engage articles carried by the truck, the opening in the closure at the end of the case being of a size to permit free movement of the chain therethrough, and the slot being of a size to lock the chain links therein.

4. An attachment for trucks and the like comprising a case mounted beneath the truck longitudinally thereof, a chain adapted to be stored within the case, a closure for one end of the case having an opening of a size to permit the chain to pass freely therethrough, and a slot extending from the opening toward the load receiving surface of the truck and of a width greater than the thickness of the links of the chain and less than the width of such links, a gripping device exterior to the closure and attached to the chain and adapted to engage articles carried by the truck, and means tending to retract the chain into the case, said gripping device being provided with an article engaging means of a length to extend over the closure toward the body of the truck when the chain is retracted.

5. An attachment for trucks and the like comprising a tubular case mounted beneath the truck longitudinally thereof and provided with a flaring end, a chain adapted to be stored in the case and provided with a weight tending to draw the chain into the case, a closure for the flaring end of the case and having an opening therethrough at a point spaced from the truck and of a size to permit the chain to pass freely therethrough and also having a slot extending from the opening toward the load receiving surface of the truck, said slot being of greater width than the thickness of the links of the chain but less than the width of a chain link, and a gripping device exterior to the case and attached to the chain, said gripping device being shaped to project over the closure for the case when the chain is fully retracted therein.

6. An attachment for trucks and the like provided with cross bars, comprising a tubular case mounted beneath the truck longitudinally thereof, a chain adapted to be stored within the case, a weight connected to one end of the chain within the case and tending to retract the chain into the case, a closure for the rear end of the case having an opening in its lower portion sufficiently large to permit the chain to pass freely therethrough, and a slot extending upwardly from the opening of a width greater than the thickness of the links of the chain, and less than the width of such links, and a gripping device for engaging articles carried on the truck and comprising a body portion, a claw at the forward end, lugs to support the rear end of the gripping device higher than the forward end, and a connection between that end of the chain remote from the weight and the lower portion of the body of the gripping device at a point between the two ends thereof, such connection extending to the rear beneath the body and between the legs, the gripping device being arranged when stored to engage with its claw over the cross rail of the truck adjacent the rear end of the tubular case with the legs of the gripping device on each side of the case.

In testimony, that I claim the foregoing as my own, I have hereto affixed my signature in the presence of two witnesses.

WILLIAM BRUCE CLARK.

Witnesses:
JOHN J. SHANNON,
CARL E. MILLER.

Copies of this patent may be obtained for five cents each, by addressing the "Commissioner of Patents, Washington, D. C."